(12) United States Patent
Spindler et al.

(10) Patent No.: US 10,644,587 B2
(45) Date of Patent: May 5, 2020

(54) CHARGERS WITH VOLTAGE AMPLITUDE MODULATION

(71) Applicant: StoreDot Ltd., Herzeliya (IL)

(72) Inventors: Leonid Spindler, Kfar Saba (IL); Yegal Darhovsky, Beer-Sheva (IL); Daniel Aronov, Netanya (IL)

(73) Assignee: Storedot Ltd., Herzeliya (IL)

( * ) Notice: Subject to any disclaimer, the term of this patent is extended or adjusted under 35 U.S.C. 154(b) by 0 days.

(21) Appl. No.: 16/551,837

(22) Filed: Aug. 27, 2019

(65) Prior Publication Data

US 2020/0052580 A1 Feb. 13, 2020

Related U.S. Application Data

(63) Continuation of application No. 15/363,512, filed on Nov. 29, 2016, now abandoned.

(60) Provisional application No. 62/409,417, filed on Oct. 18, 2016.

(51) Int. Cl.
| | |
|---|---|
| *H02J 7/00* | (2006.01) |
| *H02M 1/42* | (2007.01) |
| *H02J 7/02* | (2016.01) |
| *H01M 10/44* | (2006.01) |
| *H01M 10/0525* | (2010.01) |

(52) U.S. Cl.
CPC ......... *H02M 1/4233* (2013.01); *H01M 10/44* (2013.01); *H02J 7/022* (2013.01); *H01M 10/0525* (2013.01); *Y02B 40/90* (2013.01); *Y02B 70/126* (2013.01)

(58) Field of Classification Search
USPC .................................................. 320/107, 162
See application file for complete search history.

(56) References Cited

U.S. PATENT DOCUMENTS

| | | | |
|---|---|---|---|
| 2006/0033472 A1 | 2/2006 | Wang | |
| 2006/0103356 A1* | 5/2006 | Kodner | H02J 7/0068 320/150 |
| 2010/0080026 A1* | 4/2010 | Zhang | H02M 1/4225 363/89 |
| 2010/0164400 A1* | 7/2010 | Adragna | H02M 1/44 315/294 |
| 2012/0268060 A1 | 10/2012 | Chen | |
| 2015/0069953 A1 | 3/2015 | Seong et al. | |

OTHER PUBLICATIONS

Applicants admitted prior art (APA) see Applicants (U.S. Appl. No. 16/551,837) disclosure pp. 1 and figures 1 B,2A-2B.*

(Continued)

*Primary Examiner* — Samuel Berhanu
(74) *Attorney, Agent, or Firm* — Pearl Cohen Zedek Latzer Baratz LLP (57) ABSTRACT

Chargers and methods are provided which increase the charging efficiency of the chargers by implementing voltage amplitude modulation (VAM) instead of voltage frequency modulation. The charging voltage amplitude is modulated using feedback from at least one energy storage device that is being charged by the charger, while maintaining a charging voltage frequency constant at a LLC resonance frequency of the charger. A buck/boost configuration may be used to reduce maximal voltage levels and further optimize the charger's design.

12 Claims, 5 Drawing Sheets

(56) References Cited

OTHER PUBLICATIONS

Office action for U.S. Appl. No. 15/363,512, dated Mar. 29, 2018.
Office action for U.S. Appl. No. 15/363,512, dated Feb. 9, 2017.
Office action for U.S. Appl. No. 15/363,512, dated Jul. 3, 2017.
Office action for U.S. Appl. No. 15/363,512, dated Nov. 9, 2018.
Office action for U.S. Appl. No. 15/363,512, dated Jun. 28, 2019.

* cited by examiner

CHARGERS WITH VOLTAGE AMPLITUDE MODULATION

CROSS REFERENCE TO RELATED APPLICATIONS

This application is a continuation of U.S. patent application Ser. No. 15/363,512, filed on Nov. 29, 2016, which claims the benefit of U.S. Provisional Patent Application No. 62/409,417, filed on Oct. 18, 2016, all of which are incorporated herein by reference in their entirety.

BACKGROUND OF THE INVENTION

1. Technical Field

The present invention relates to the field of chargers for energy storage devices, and more particularly, to charger designs which increase the charger's efficiency.

2. Discussion of Related Art

Typical charging processes (of various energy storage cells, such as batteries, supercapacitor packs) are carried out by chargers in either a constant current mode or a constant voltage mode. Chargers operate at maximum power in the constant current mode, with the cell voltage near its maximum, and a softly switched LLC (i.e., with a capacitance $C_r$, a serial inductance $L_r$ and a parallel inductance $L_m$) resonant converter is typically used to handle high power and produce variable voltage gains in different operating frequencies while providing soft switching for all involved semiconductor devices. Such charger has one or more LLC resonance frequencies.

Typical softly switched LLC resonant converters have a half-bridge or full-bridge converter connected via a switching circuit to a resonant LLC tank circuit to which the load is connected. Switching operations (square waves delivered to the LLC tank) are synchronized to zero crossing of the voltage or current (ZVS or ZCS, respectively), to reduce switching losses. The LLC tank delivers only fundamental sinusoidal waveforms and thus forces the voltage or current to be sinusoidal. A rectifier is used to convert the sinusoidal LLC tank output (alternating current—AC) to direct current (DC) output to the charger cell(s).

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of increasing a charging efficiency of a charger, the method comprising modulating a charging voltage amplitude using feedback from at least one energy storage device that is being charged by the charger, while maintaining a charging voltage frequency constant at a LLC resonance frequency of the charger.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Chargers and methods are provided which increase the charging efficiency of the chargers by implementing voltage amplitude modulation (VAM) instead of voltage frequency modulation. The charging voltage amplitude is modulated using feedback from at least one energy storage device that is being charged by the charger, while maintaining a charging voltage frequency constant at a LLC resonance frequency of the charger. A buck/boost configuration may be used to reduce maximal voltage levels and further optimize the charger's design.

Figure 1A:
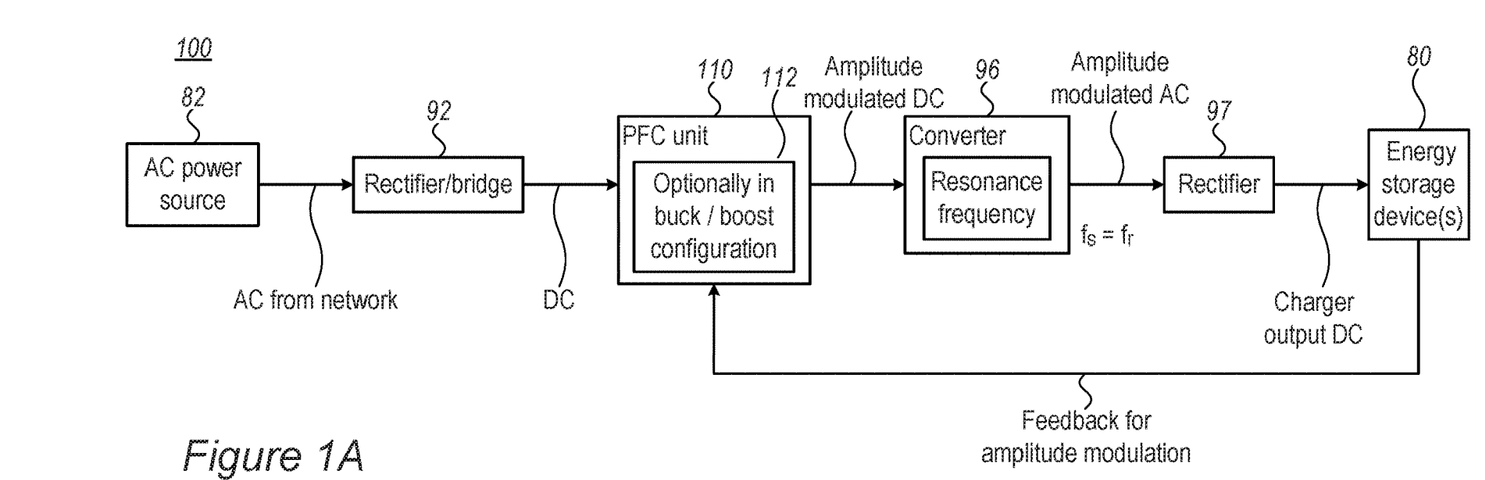
FIGS. 1A and 1B are high level comparative schematic block diagrams of a charger according to some embodiments of the invention (FIG. 1A), compared with a charger according to the prior art (FIG. 1B).
Figure 1B:
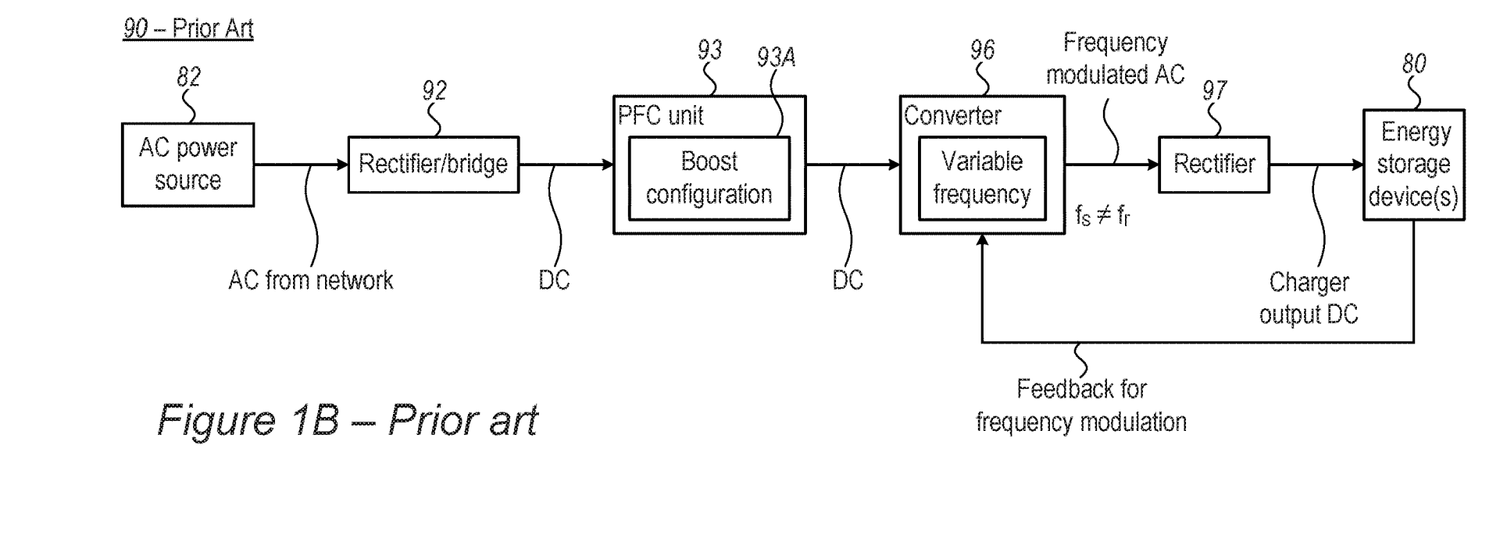

FIGS. 1A and 1B are high level comparative schematic block diagram of a charger 100 according to some embodiments of the invention (FIG. 1A), compared with a charger 90 according to the prior art (FIG. 1B). Charger 100 comprises a PFC (power factor correction) unit 110 configured to implement charging voltage amplitude modulation according to a feedback to PFC unit 110 from at least one energy storage device (cell load, e.g., a battery, a capacitor, e.g., lithium ion batteries) 80 that is being charged by charger 100. Disclosed chargers 100 enable operation at the resonance frequency $f_s$ of converter 96, which provides the maximal efficiency during the whole charging process. PFC unit 110 may be configured in a buck/boost configuration to enable the charging voltage amplitude modulation below a maximum input voltage to the charger. Advantageously, with respect to prior art chargers 90 which implement frequency modulation, charger(s) 100 operating at the resonance frequency of the LLC achieve higher efficiency, as exemplified below.

In the prior art (as illustrated e.g., in FIG. 1B), chargers 90 for energy storage device typically receive network AC power (e.g., from a power source 82), rectify the AC to DC via a rectifier 92 (e.g., a bridge). The DC is then boosted to a voltage level which is above the maximal network voltage (see example below) by PFC unit 93 in boost configuration 93A and is converted to frequency modulated AC by a converter 96 according to feedback from energy storage device 80 that is being charged by the frequency modulated AC via a rectifier 97. Due to the frequency modulation, prior art chargers 90 inherently cannot be operated at the resonance frequency, which is optimized for maximal efficiency.

In contrast, disclosed chargers 100 (as illustrated e.g., in FIG. 1A) are configured to modulate the amplitude of the DC from PFC unit 110 to yield amplitude modulated AC from converter 96 at its resonance frequency, to yield maximal efficiency during the charging. Moreover, PFC unit 110 may be configured in buck/boost configuration 112 which may provide DC levels which may be occasionally lower ("buck") than the maximal level of AC power source 82.

It is emphasized that disclosed chargers 100 may be implemented in various ways and the feedback for amplitude modulation may be implemented in respective configurations, as appreciated by a person skilled in the art.

Figure 2A:
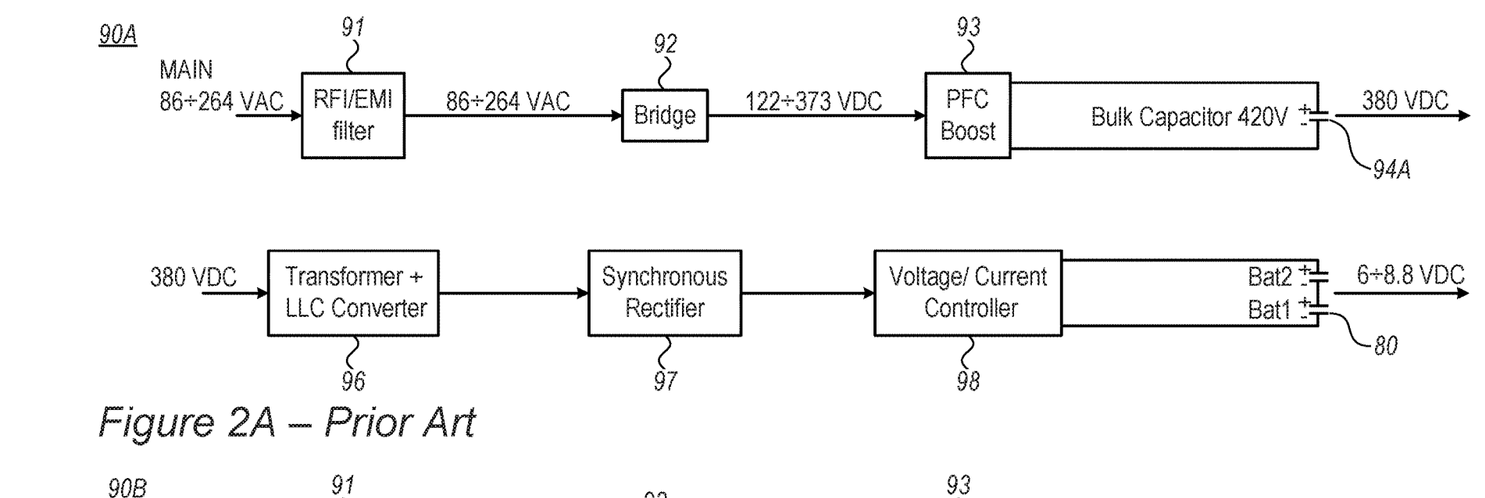
FIGS. 2A and 2B exemplify schematically block diagrams of prior art chargers with exemplary values for voltage ranges and current profiles.
Figure 2B:
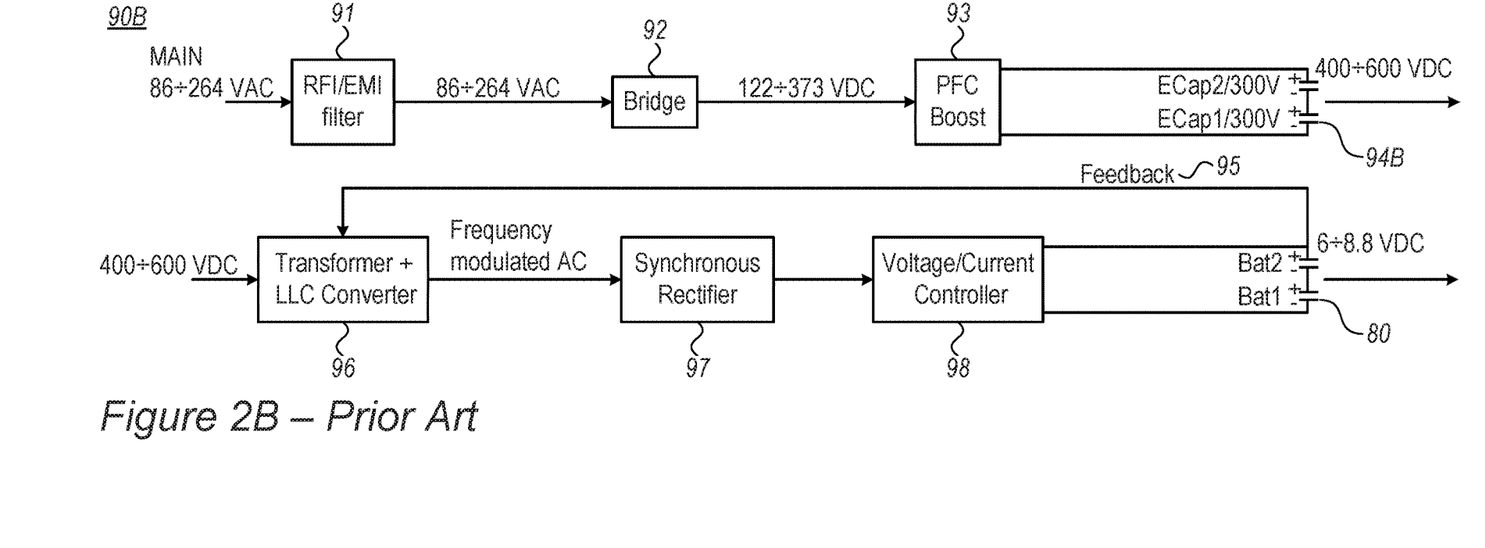

FIGS. 2A and 2B exemplify schematically block diagrams of prior art chargers 90A, 90B with exemplary values for voltage ranges and current profiles. The indicated voltage levels (VAC for AC voltage and VDC for DC voltage) are provided to illustrate a possible range of voltages under various circumstances (depending on the AC power source and charger configuration). The main AC voltage is typically filtered by a RFI/EMI (radiofrequency/electromagnetic interference) filter 91, rectified by a bridge 92 (e.g., a half bridge or a full bridge) and boosted by PFC 93 to a voltage level beyond the maximal voltage level of the AC power source (e.g., 380V in FIG. 2A, 400V-600V in FIG. 2B), over one or more illustrated capacitors 94A, 94B, respectively.

The boosted voltage level is converted back to AC by LLC converter 96 and delivered via a rectifier 97 to a voltage/current controller 98 which charges energy storage device(s) 80 such as batteries. In order to implement ZVS, ZCS (as explained above) or ZPS (zero power switching, as explained below), prior art chargers 90B provide feedback 95 from charged energy storage device(s) 80 (e.g., cells, batteries, etc.) which is used to modulate the switching frequency during the charging process.

Figure 2C:
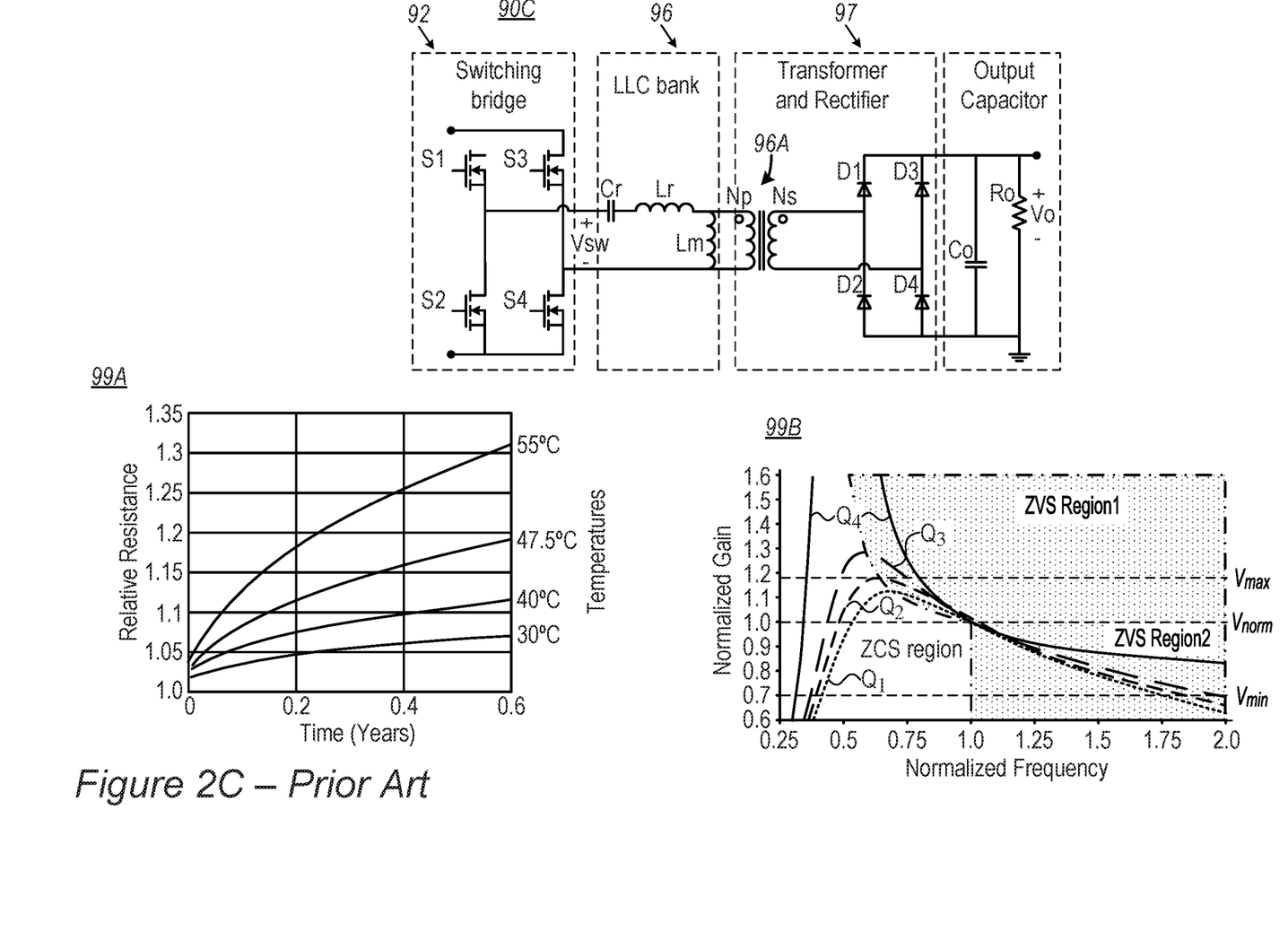
FIG. 2C illustrates schematically aspects of prior art chargers.

FIG. 2C illustrates schematically aspects of prior art chargers 90 which are overcome by embodiments of the disclosed invention. In particular the switching with respect to LLC tank in converter 96 of charger 90C (having a full-bridge LLC converter with full-bridge rectifier) is discussed below. It is noted that similar principles are applicable in various charger topologies.

In zero power switching (ZPS), the MOSFETs (metal-oxide-semiconductor field-effect transistors) of the switching network are driven by PWM (pulse-width modulation) signals to generate a square wave for resonant tank circuit 96. However, tank circuit 96 supports only fundamental sinusoidal waveforms which are then rectified by output rectifier 97 to provide the desired DC output voltage. A transformer 96A may be coupled to LLC tank 96 as the parallel inductance, permitting operation in a galvanically-isolated environment. Converters 96 converters are characterized by two operating frequencies, with respect to which power transfer and output voltage are managed (via feedback 95), namely $f_s$—the switching frequency, as imposed by the control electronics (the frequency at which the MOSFETs are operated), which dynamically variable; and $f_r$—the natural resonant frequency of the LLC tank in converter 96, which is fixed by choice of the LLC components. As a result, prior art charger configurations necessarily operate at least some of the time with $f_s \neq f_r$, i.e., at sub-optimal conditions, resulting in switching losses expressed in Equations 1, with $P_{conduction}$ denoting the conduction losses and $P_{switching}$ denoting the switching losses.

$$P_{loss,MOSFET} = P_{conduction} + P_{switching};$$
$$P_{conduction} = I^2_{MOSFET,rms} * R_{DS,on},$$

Equations 1

The reason for prior art losses is that the LLC topology only provides optimum efficiency performance when $P_{switching}$ is almost eliminated, around the resonant frequency ($f_r$) between its resonant inductor ($L_r$) and capacitor ($C_r$). However, in order to be adapted to the wide voltage gain variation range, the switching frequency ($f_s$) must swing in a wide range and deviate from $f_r$, especially in case of energy storage chargers, since the load (energy storage device(s) 80) varies as function of charging state, temperature, time, charging/discharging rate, etc. of energy storage device(s) 80, as indicated in graphs 99A and 99B in FIG. 2C, the former showing the increasing internal resistance with time and temperature for a typical energy storage device and the latter showing the DC voltage gain of LLC converter 96 adapted to a wide output voltage range. As shown, the desired output voltage window [$V_{min}, V_{max}$] on the gain axis is mapped to an ultra-wide switching frequency range in the frequency axis (denoted ZCS region). Therefore, it is extremely difficult to optimally design LLC converter 96 in prior art chargers 90.

Figure 3:
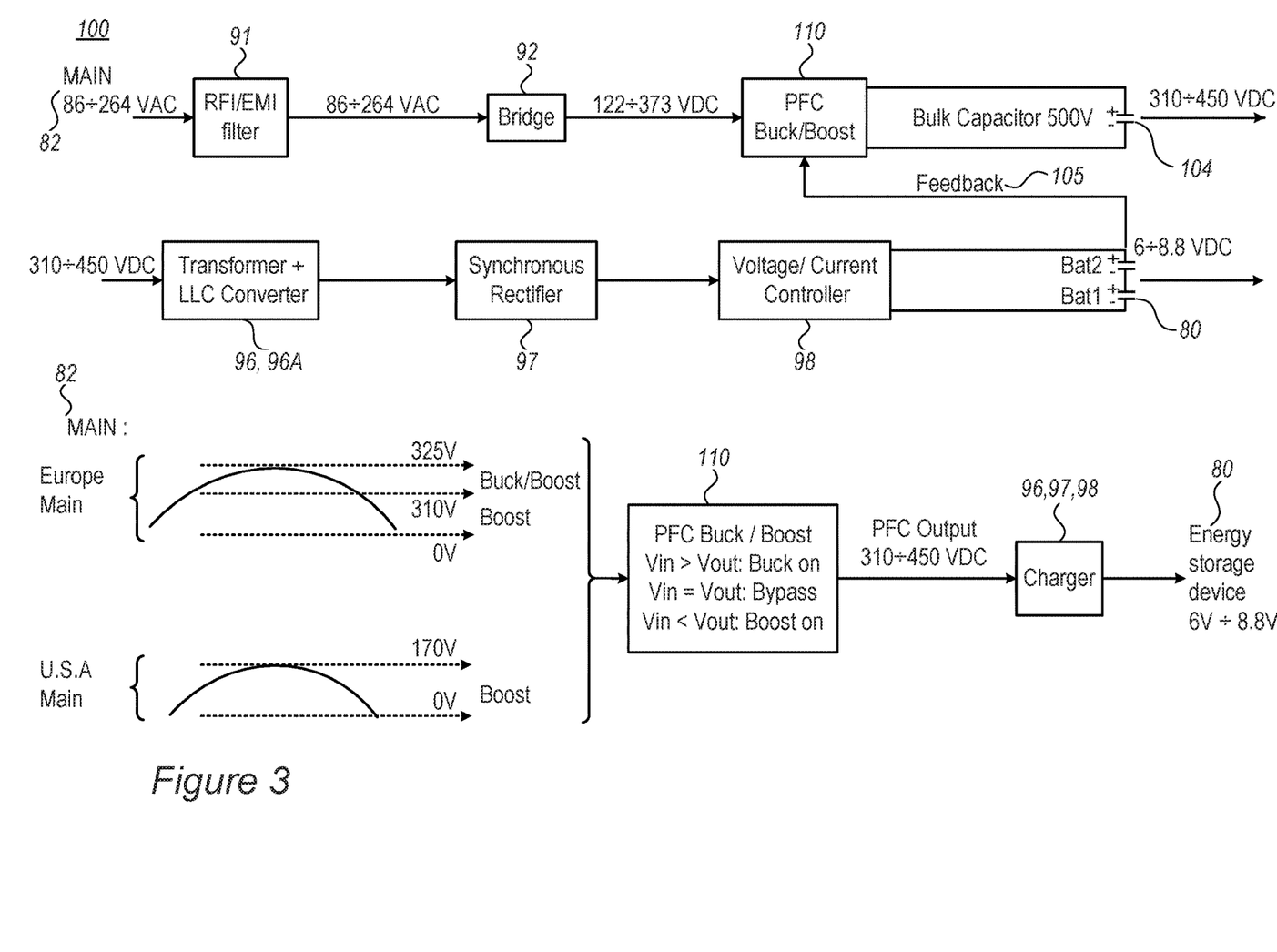
FIG. 3 is a high level schematic block diagram of chargers, according to some embodiments of the invention.

FIG. 3 is a high level schematic block diagram of charger 100, according to some embodiments of the invention. In chargers 100, an amplitude modulation feedback 105 is implemented to modulate the DC voltage amplitude instead of modulating the AC frequency as in prior art chargers 90.

In contrast to prior art configurations illustrated in FIGS. 2A and 2B, feedback 105 enables operating converter 96 at its resonance frequency $f_r$ and achieve thereby higher efficiency of charger 105. Charger 100 is illustrated by a non-limiting example of voltage amplitude modulation (VAM) LLC resonant converter 96 for two batteries in serial connection as energy storage device 80. The illustrated topology is derived from the LLC topology with input voltage modulation stage via buck or/and boost topology PFC converter.

Chargers 100 may comprise PFC unit 110, receiving DC from bridge 92 which rectifies AC from main 82 after EMI/RFI filter 91. PFC unit 110 may use feedback 105 from load 80 (any energy storage device, e.g., fast charging lithium ion batteries) to modify the amplitude of DC provided to converter 96 while charger 100 operates continuously with the resonance frequency ($f_r$) of converter 96. Load 80 is charged with DC supplied via controller 98 after being rectified by rectifier 97. In certain embodiments, converter 96 implemented with transformer 96A, and the output voltage range from transformer 96A is limited by the amplitude control range and may be regulated to meet the final required output voltage. In certain embodiments, PFC unit 110 may be in a buck/boost configuration (and not only in boost configuration as in prior art chargers 90) to provide lower DC amplitude in at least some sub-range of its operation.

Charger 100 may be configured to implement controlled LLC topology with minimum losses by simultaneously maintaining a constant frequency and apply ZPS on the semiconductor elements (with the LLC topology operating at its resonant frequency). The voltage is controlled via its amplitude (in chargers 100) instead of via its frequency (in prior art chargers 90). An additional advantage of disclosed designs is that the LLC is much simpler, as only one frequency is implemented and calibrated. The inventors have found out that advantageously, chargers 100 provide optimum efficiency of the LLC power circuit, ZPS turning-on and turning-off the MOSFETs, reduced circulating current and conduction losses, reduced EMI/RFI (due to the use of a constant frequency), reduced size of magnetic components, simpler LLC converter 96 may be used (e.g., transformer 96A is simpler due to lack of skin effect and lower losses of the ferrite), the bypass voltage during the charging may result in almost 100% efficiency, as well as provision of the other advantages of ZPS use.

In chargers 100, the switching frequency of LLC converter 96 may be fixed and equal to the resonant frequency between the transformer's primary leakage inductance and the resonant capacitance, as expressed in Equation 2.

$$f_s = f_r = (1/2\pi)/(L_r \cdot C_r)^{1/2}$$ Equation 2

In such case, the resonant tank has unity gain and best optimized operation and efficiency, therefore, the turns ratio of transformer 96A may be designed so that converter 96 operates at this point at nominal input and output voltages defined by PFC converter output and transformer respectively. Moreover, using such schemes, only one high voltage capacitor 104 may be required for 450V output compared to two high voltage capacitors 94B for 600V that must be used in standard schemes of prior art chargers 90B with feedback 95 (see FIG. 2B).

It is emphasized that energy storage device 80 may be of any kind, and charger 100 may serve for any number of batteries in serial and/or parallel connection, with the charger's voltage being defined by the buck or/and boost topology PFC output and the transformer. Moreover, buck and boost topology PFC converter 100 may be configured to use any AC input voltage, like European (220V AC), USA (110V AC), etc., as exemplified in FIG. 3. For example, when input to PFC 110 is in the range of 310V-325V (using e.g., Europe main) there is a bypass voltage effect (no need for buck or boost), since the input voltage falls in the output range. In this case, the efficiency is almost 100%.

Table 1 provides and exemplary simulation-based illustration of advantages of charger(s) 100 over prior art chargers 90 for charging two serially connected batteries as energy storage device 80, using a charging current of 30 A. In this example the batteries can be charged up to $V_{out}$=8.8V and discharged down to $V_{out}$=6V. The data compares two different topologies based on standard design frequency modulation LLC (prior art charger 90, where $V_{in,LLC}$=450V is constant, and $f_s$ is modified) and VAM (voltage amplitude modulation) LLC as implemented in embodiments of charger 100, where $V_{in,LLC}$ is modified and the frequency is fixed at $f_s$=$f_r$=70 kHz).

TABLE 1

Comparison of some embodiments with the prior art.

| | Prior art charger 90 | | Disclosed VAM charger 100 | |
|---|---|---|---|---|
| | $f_s = f_r$ $P_{out} =$ $P_{out, max}$ | $f_s > f_r$ $P_{out} =$ $P_{out, min}$ | $f_s = f_r$ $P_{out} =$ $P_{out, min}$ | |
| $V_{in, LLC}$ (V) | 450 | 450 | 450 | 310 |
| $V_{out}$ (V) | 8.8 | 6 | 8.8 | 6 |
| $I_{out}$ (A) | 30 | 30 | 30 | 30 |
| $f_s$ (KHz) | 70 | 121 | 70 | 70 |
| $P_{in}$ (W) | 269 | 186 | 269 | 185 |
| $P_{out}$ (W) | 264 | 181 | 264 | 180 |
| $P_{conduction}$ (W) | 5.56 | 5.38 | 5.56 | 5.55 |
| μ (%) | 98 | 97 | 98 | 97 |
| $I_{primery, rms}$ (A) | 1.34 | 1.36 | 1.34 | 1.34 |
| $I_{secondary, rms}$ (A) | 33.27 | 33.55 | 33.27 | 33.27 |
| $I_{MOSFET, rms}$ (A) | 0.32 | 2.06 | 0.32 | 0.36 |

Table 1 illustrates that, as in LLC-based chargers the minimized losses ($P_{switching}$) are proportional to $I_{MOSFET,rms}$, the current of 0.36 Ampere used by charger 100 is highly advantageous with respect to the current of 2.06 Ampere used by prior art charger 90. This is due to the keeping of the frequency at the resonance frequency, as indicated in the shaded table entries comparing prior art chargers 90 and disclosed chargers 100.

Figure 4:
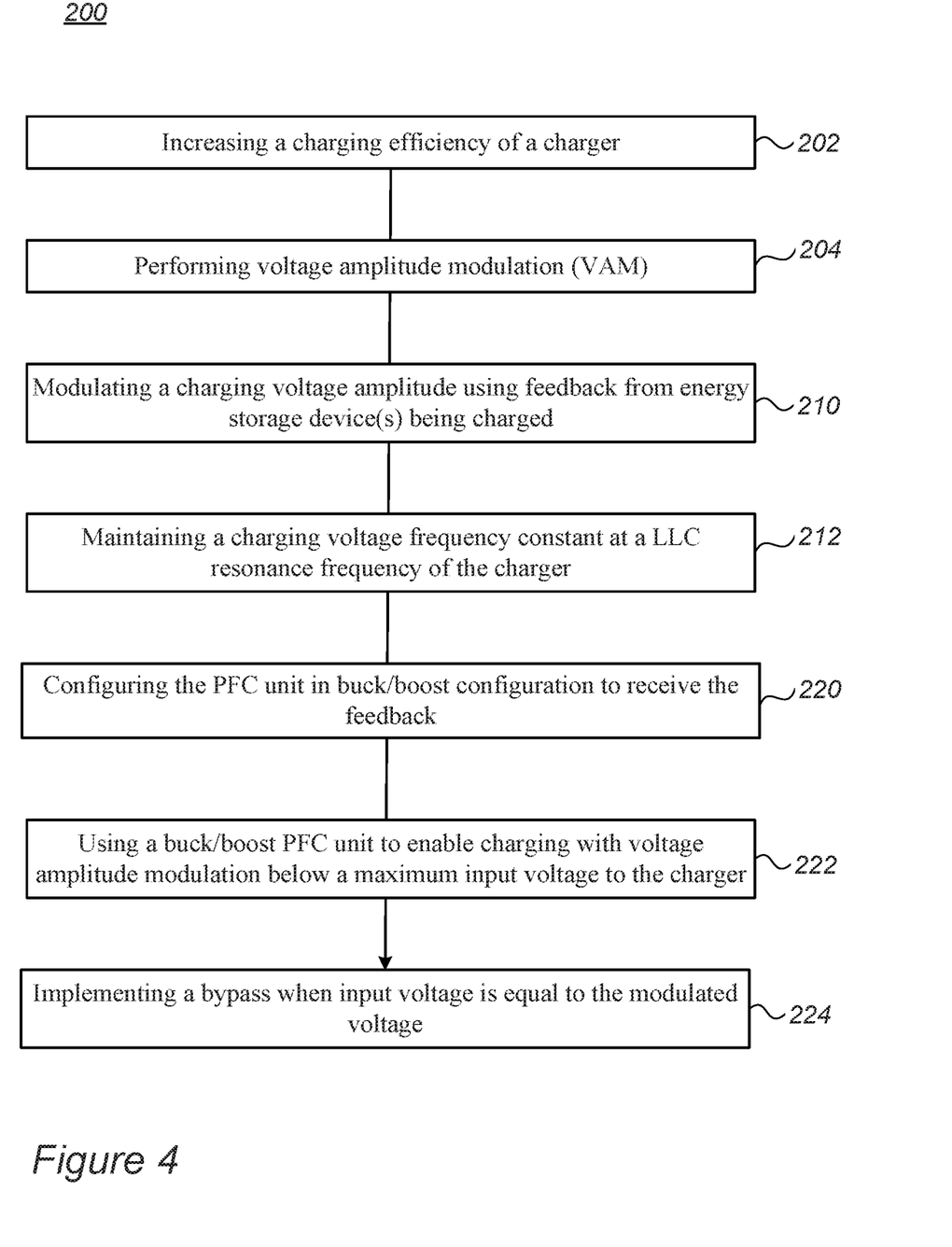
FIG. 4 is a high level flowchart illustrating a method, according to some embodiments of the invention.

FIG. 4 is a high level flowchart illustrating a method 200, according to some embodiments of the invention. The method stages may be carried out with respect to charger 100 described above, which may optionally be configured to implement method 200. Method 200 may comprise stages for producing, preparing and/or using charger 100, such as any of the following stages, irrespective of their order.

Method 200 may comprise increasing a charging efficiency of a charger 202 by performing input voltage amplitude modulation (VAM) (stage 204). Method 200 may comprise modulating a charging voltage amplitude using feedback from at least one energy storage device (such as fast charging lithium ion battery(ies)) that is being charged by the charger (stage 210), while maintaining a charging voltage frequency constant at a LLC resonance frequency of the charger (stage 212).

Method 200 may further comprise configuring the PFC unit in buck/boost configuration to receive the feedback (stage 220) and using a buck/boost PFC unit to enable charging with voltage amplitude modulation below a maximum input voltage to the charger (stage 222). Method 200 may further comprise implementing a bypass when input voltage is equal to the modulated voltage (stage 224).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A charger for charging an energy storage device from an AC (alternating current) power source, the charger comprising:
    a first rectifier configured to rectify AC power from the AC power source into rectified DC (direct current),
    a PFC (power factor correction) unit configured to receive the rectified DC from the first rectifier and to deliver amplitude-modulated DC,
    a DC-to-AC converter comprising a LLC circuit, wherein the DC-to-AC converter is configured to operate at a LLC resonance frequency fs of the LLC circuit and convert the amplitude-modulated DC into amplitude modulated AC, and
    a second rectifier configured to rectify the amplitude-modulated AC into charger output DC which is used to charge the energy storage device,
    wherein the PFC unit is further configured to receive feedback from the energy storage device that is being charged—and to carry out the amplitude modulation at an output of the PFC unit with respect to the delivered feedback.

2. The charger of claim 1,
    wherein a modulated voltage amplitude of the amplitude modulated DC is lower than a maximal voltage received from the AC power source, and
    wherein the PFC unit is configured in a buck/boost configuration to derive the modulated voltage amplitude from the higher maximal voltage received from the AC power source.

3. The charger of claim 1, further comprising a bypass of the PFC unit which is applied when an input voltage to the charger is equal to the modulated voltage.

4. The charger of claim 1, configured to charge at least one fast charging lithium ion battery as the energy storage device.

5. A method of increasing a charging efficiency of a charger for charging an energy storage device from an AC (alternating current) power source, the method comprising:
    rectifying AC power from the AC power source into rectified DC (direct current),
    deriving amplitude-modulated DC from the rectified DC by a PFC (power factor correction) unit, wherein the amplitude modulation is determined according to feedback received from the energy storage device that is being charged by the charger,
    converting the derived amplitude-modulated DC into amplitude-modulated AC by a DC-to-AC converter that comprises a LLC circuit, wherein the converting is carried out at a LLC resonance frequency $f_s$ of the LLC circuit,
    rectifying the amplitude-modulated AC into charger output DC which is used to charge the energy storage device.

6. The method of claim 5,
    wherein a modulated voltage amplitude of the amplitude-modulated DC is lower than a maximal voltage received from the AC power source, and
    wherein the method further comprises configuring the PFC unit in a buck/boost configuration to derive the modulated voltage amplitude from the higher maximal voltage received from the AC power source.

7. The method of claim 5, further comprising implementing a bypass of the PFC unit when an input voltage to the charger is equal to the modulated voltage.

8. The method of claim 5, wherein the at least one energy storage device comprises at least one fast charging lithium ion battery.

9. A charger for an energy storage device, comprising:
    a first rectifier configured to rectify AC power from an AC power source into rectified DC,
    a PFC (power factor correction) unit configured to implement amplitude modulation at an output of the PFC unit, with respect to received rectified DC, received from the first rectifier, and according to feedback from the energy storage device that is being charged, and
    a DC-to-AC converter configured to convert the amplitude-modulated DC into amplitude modulated AC, at a LLC resonance frequency of an LLC circuit thereof,
    a second rectifier configured to rectify the amplitude-modulated AC into charger output DC which is used to charge the energy storage device,
    wherein the amplitude modulated AC is rectified by the second rectifier and is used to charge the energy storage device.

10. The charger of claim 9,
    wherein a modulated voltage amplitude of the amplitude-modulated DC is lower than a maximal voltage of the received rectified DC, and
    wherein the PFC unit is configured in a buck/boost configuration to derive the amplitude-modulated DC from the higher maximal voltage of the received rectified DC.

11. The charger of claim 9, further comprising a bypass of the PFC unit which is applied when the received rectified DC is equal to the amplitude-modulated DC.

12. The charger of claim 9, configured to charge at least one fast charging lithium ion battery as the energy storage device.

* * * * *